(12) United States Patent
Luber

(10) Patent No.: US 7,500,314 B2
(45) Date of Patent: Mar. 10, 2009

(54) HOOF KNIFE WITH MOVEABLY MOUNTED BLADE

(76) Inventor: Josef Luber, Trichenricht Nr. 6, Schnaittenbach (DE) 92253

( * ) Notice: Subject to any disclaimer, the term of this patent is extended or adjusted under 35 U.S.C. 154(b) by 284 days.

(21) Appl. No.: 11/354,243

(22) Filed: Feb. 15, 2006

(65) Prior Publication Data

US 2006/0179986 A1 Aug. 17, 2006

(30) Foreign Application Priority Data

Feb. 16, 2005 (DE) .................. 20 2005 002 567 U
May 13, 2005 (DE) ...................... 10 2005 022 393

(51) Int. Cl.
*B26B 3/00* (2006.01)
*A01L 11/00* (2006.01)

(52) U.S. Cl. ...................... 30/339; 30/342; 168/48.1
(58) Field of Classification Search .................. 30/329, 30/330, 331, 339, 342, 344; 168/48.1
See application file for complete search history.

(56) References Cited

U.S. PATENT DOCUMENTS

| | | | | | |
|---|---|---|---|---|---|
| 547,703 | A | * | 10/1895 | Wilbanks | 168/48.1 |
| 664,175 | A | * | 12/1900 | Plochow | 30/320 |
| 1,997,131 | A | * | 4/1935 | Champlin | 30/342 |
| 2,738,581 | A | * | 3/1956 | Palmer | 30/320 |
| 2,753,632 | A | * | 7/1956 | Varn | 30/355 |
| 2,953,175 | A | * | 9/1960 | Robinson, Jr. et al. | 30/519 |
| 3,261,095 | A | * | 7/1966 | Nelson et al. | 30/169 |
| 3,609,864 | A | * | 10/1971 | Bassett | 30/261 |
| 3,845,554 | A | * | 11/1974 | Joanis et al. | 30/125 |
| 3,863,339 | A | * | 2/1975 | Reaney et al. | 30/162 |
| 3,872,572 | A | * | 3/1975 | Hahn | 29/432.1 |
| 4,187,607 | A | * | 2/1980 | Simuro et al. | 30/152 |
| 4,945,638 | A | * | 8/1990 | Dietel | 30/309 |
| 5,319,854 | A | * | 6/1994 | Pracht | 30/254 |
| 6,202,754 | B1 | * | 3/2001 | Luttrell | 168/48.1 |
| 6,701,621 | B2 | * | 3/2004 | Kain et al. | 30/160 |
| 6,845,561 | B2 | * | 1/2005 | Timson | 30/125 |
| 7,020,969 | B2 | * | 4/2006 | Roberson | 30/152 |

FOREIGN PATENT DOCUMENTS

DE 197 40 875 C1 6/1998

* cited by examiner

*Primary Examiner*—Hwei-Siu C Payer
(74) *Attorney, Agent, or Firm*—Hoffman, Wasson & Gitler, P.C.

(57) ABSTRACT

A knife or hoof knife where the cutting blade element of the hoof knife is flexibly mounted in the knife handle, at least partially compensating rough motions during trimming. The knife with this design therefore fits more comfortably in the hand and enables, for example, wrist-friendly trimming of a horse's hoof. The flexibility can also be varied by the use of damping elements with different hardnesses and by designing the cutting blade element as an exchangeable module, so that different cutting blade elements can be provided on one handle element.

18 Claims, 1 Drawing Sheet

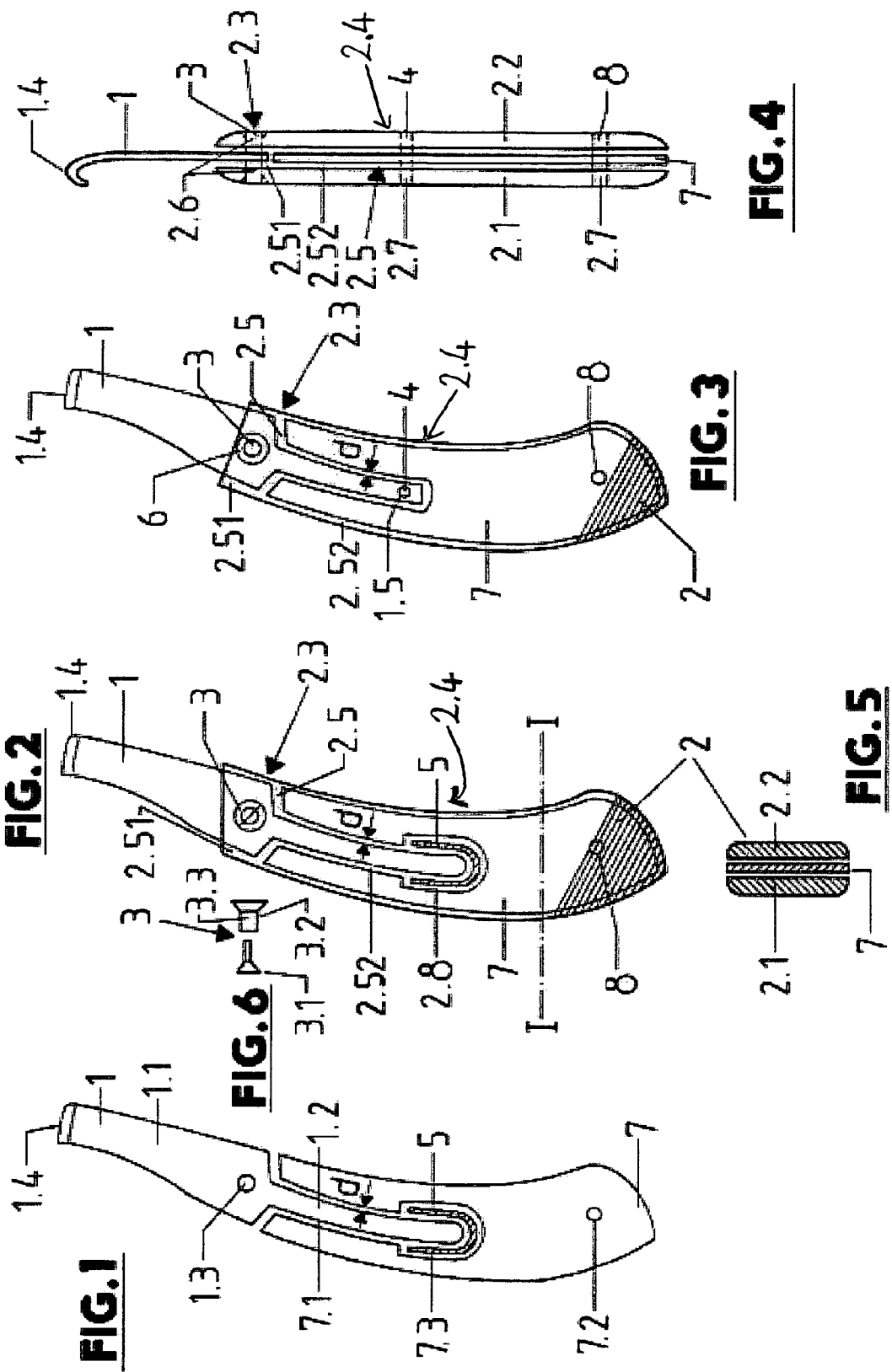

US 7,500,314 B2

HOOF KNIFE WITH MOVEABLY MOUNTED BLADE

BACKGROUND OF THE INVENTION

The invention relates to a knife, especially a hoof knife with a cutting blade element that is moveably mounted in a handle element, wherein the cutting blade element is at least partially inserted into a guide channel of the handle element and is fixed in the handle element.

Knives, in particular knives with longitudinally moveable blades, are known in the art and are used for a variety of purposes. In particular, the German patent specification 197 40 875 C1 discloses a knife with a moveable blade, in which the blade, which is mounted in a handle and is moveable in the longitudinal direction of the handle, features an opening, in which a locking pin is mounted that is moveable in its axial direction and which serves as a lever to move the blade. The locking pin is moveable in a slot provided on the handle side, wherein the slot is enlarged on its front end to form a recess, into which the locking pin can engage to lock the blade in the extended position. The locking pin is designed in three parts, i.e. one top part forming the lever, one middle part and one lower part. To lock the blade in the extended position, the locking pin is moveable in its axial direction by applying manual pressure to the upper part so that the upper part engages in the recess provided on the one side of the handle and the lower part engages in a hole provided in the other side of the handle.

Furthermore, hoof knives for trimming animal hooves, in particular horse hooves, are known that feature different blade and edge shapes for cutting different areas of the hoof. The blade of these hoof knives is rigidly connected by means of at least two fastening means, for example screw or rivet connecting elements, with the handle element of the hoof knife. A disadvantage of the rigid connection of the blade with the handle element is that all hard or rough cutting motions, for example when trimming a horse's hoof, are absorbed by the wrist of the farrier. This means that the wrist is subjected to an enormous strain when trimming the hoof using conventional hoof knifes, resulting in rapid fatigue and permanent damage to the wrist of the farrier.

It is an object of the present invention to present a knife, in particular a hoof knife, which protects the wrist of the user even during hard and rough cutting motions and therefore produces a comfortable cutting effect.

SUMMARY OF THE INVENTION

The essential advantage of the knife or hoof knife according to the invention is the fact that the cutting blade element of the hoof knife is flexibly mounted in the knife handle, at least partially compensating rough motions during trimming. The knife with this design therefore fits more comfortably in the hand and enables, for example, wrist-friendly trimming of a horse's hoof. The flexibility can also be varied by the use of damping elements with different hardnesses and by designing the cutting blade element as an exchangeable module, so that different cutting blade elements can be provided on one handle element.

The invention is described in more detail below based on several exemplary embodiments with reference to several drawings, wherein:

FIG. 1 shows a simplified representation of a top view of a cutting blade element and the corresponding spacer element;

FIG. 2 shows a simplified representation of a top view of a knife with an integrated cutting blade element and a spacer element as in FIG. 1;

FIG. 3 shows a simplified representation of a top view of an alternative embodiment of the knife according to the invention;

FIG. 4 shows a simplified representation of a side view of the knife in FIG. 3;

FIG. 5 shows a cross section along the line l-l through the knife in FIG. 2; and FIG. 6 shows a side view of one embodiment of a fastening element.

The drawings show a knife, preferably a hoof knife for trimming a horse's hoof, in various embodiments and perspectives. The hoof knife consists of a blade or cutting blade element 1 and a handle element 2 connected with the blade element, wherein the cutting blade element 1 comprises a cutting element 1.1 and an adjoining holding element 1.2, which adjoins the cutting element 1.1 in the longitudinal direction of the cutting blade element 1.

Before or within the transition area between the cutting element 1.1 and the holding element 1.2 there is a hole 1.3, which is provided approximately in the center in the area of the longitudinal axis of the cutting blade element 1. On the free end of the cutting element 1.1 opposing the holding element 1.2, a knife edge 1.4 provided for trimming the horse's hoof can have different shapes or designs for different applications. Furthermore, a second hole 1.5 can be provided in the area of the holding element 1.2 facing away from the cutting element 1.1.

According to FIG. 1, the cutting blade element 1 or its holding element 1.2, which features a considerably reduced width in comparison with the cutting element 1.1, is provided with a spacer element 7, wherein the cutting blade element 1 can be connected with the spacer element 7 so that the front side of the spacer element 7 facing the cutting blade element 1 adjoins nearly seamlessly the cutting element 1.1 while holding the holding element 1.2, i.e. there is a smooth transition between the outer contours of the cutting element 1.1 and the outer contours of the spacer element 7. For holding the holding element 1.2 in the spacer element 7 the spacer element 7 features a slot-shaped recess 7.1, which extends from the front side of the spacer element 7 facing the cutting blade element 1 along the longitudinal axis of the spacer element 7, wherein the width of the slot-shaped recess 7.1 is such that a distance d of at least 0.01 mm or more remains between the holding element 1.2 or its sides inserted into the slot-shaped recess 7.1 and the inner sides of the slot-shaped recess 7.1 of the spacer element 7. In an alternative embodiment of the spacer element 7 the slot-shaped recess 7.1 features a widened area 7.3 on its end facing away from the recess opening, said widened area having for example a U-shape.

The spacer element 7 is part of the handle element 2 of the hoof knife and is located between one first and one second handle shell element 2.1, 2.2 of the handle element 2. For connecting the spacer element 7 with the first and second handle shell element 2.1, 2.2, at least one hole 7.2 is provided in the section facing away from the cutting blade element 1, i.e. adjoining the slot-shaped recess 7.1 of the spacer element 7. The described "layered or modular" design of the handle element 2 is indicated by way of example in FIG. 5 by a cross section along the line l-l through a knife according to FIG. 2.

The first and second handle shell element 2.1, 2.2 are designed nearly congruently with the spacer element 7 and therefore have nearly the same outer contours. The spacer element 7 virtually forms the extension or continuation of the cutting blade element 1 between the first and second handle shell element 2.1, 2.2 of the handle element 2. The first and second handle shell element 2.1, 2.2 can be made of different materials, for example wood, metal, plastic, mother of pearl or similar sturdy materials and/or can exhibit different patterns, colors and/or surface structures.

In a preferred embodiment, the first and second handle shell elements 2.1, 2.2 are connected with the spacer element 7 by means of at least one releasable fastening element 3 and at least one additional fixed fastening element 4, 8. For this purpose, the individual fastening elements 3, 4, 8 are designed either as screw connecting elements or as rivet connecting elements or similar releasable or fixed connecting elements.

By means of the described releasable or fixed connection of the first and second handle shell element 2.1, 2.2 with the spacer element 7 provided between the first and second handle shell element 2.1, 2.2, a guide channel 2.5 is provided in the handle element 2 featuring at least one first and second sections 2.51, 2.52 and extending along the longitudinal axis of the handle element 2. The first section 2.51 of the guide channel 2.5 is provided for holding the holding element 1.2 and the second section 2.52 of the guide channel 2.5 is provided for at least partial holding of the cutting element 1.1.

In a preferred embodiment the first and second handle shell element 2.1, 2.2 each have a hole 2.6 in the section 2.3 of the handle element 2 facing the cutting blade element 1, the middle axis of said hole extending perpendicular to the surface of the handle element 2. In an alternative embodiment the first and second handle shell element 2.1, 2.2 have at least one additional hole 2.7 in the section 2.4 of the handle element 2 facing away from the cutting blade element 1 and/or in the end area of the guide channel 2.5, into which (hole) the additional fastening elements 4, 8 can be inserted.

When a cutting blade element 1 is inserted into the guide channel 2.5, the opposing holes 2.6 and 2.7 provided in the first and second handle shell elements 2.1, 2.2 are congruent or on the same axis with the first hole 1.3 and/or the second hole 1.5 of the cutting blade element 1.

For flexible mounting of the cutting blade element 1 in the handle element 2, at least one damping element 5, 6 is provided, which is designed either as a U-shaped sleeve or case element 5 or as a damping ring element 6. In a preferred embodiment, the damping elements 5, 6 are exchangeable and are provided for example in the first and second section 2.3, 2.4 of the handle element 2. They are furthermore made of a flexible material, and the degree of damping can be adjusted via the hardness of the flexible material. Therefore, it is possible for example to use damping elements 5, 6 with differing hardnesses to adjust the damping properties depending on the use of the knife.

In an embodiment according to FIG. 2, the guide channel 2.5 forms in its first section 2.51, on its end facing away from the cutting blade element 1, a holding space 2.8, which preferably is U-shaped, so that the holding element 1.2 bears for example flush with its rounded end, surrounded by the U-shaped sleeve or case element 5 in the holding space 2.8. The rotatable mounting of the cutting blade element 1 on the fastening element 3 results in a lever, the end of which, opposing the cutting edge 1.4, is held flexibly in the handle element by means of the U-shaped sleeve or case element 5. The U-shaped sleeve or case element 5 has approximately the same thickness as the spacer element and/or the holding element 1.2.

In a further preferred embodiment of the invention, the first handle shell element 2.1, followed by the spacer element 7 and the second handle shell element 2.2 are connected tightly with each other, preferably by means of a rivet and/or screw and/or adhesive connection. The elements 2.1, 2.2, 7 thus connected with each other form a handle element module or the handle 2 of the knife, on which various cutting blade element modules can be provided.

However, the spacer element 7 is shorter than the first and second handle shell element 2.1, 2.2, forming the second section 2.52 of the guide channel 2.5 in the connecting area or fastening area of the cutting blade element 1. The second section 2.52 of the guide channel corresponds for example to the width of the cutting element 1.1 in the transition area between the cutting element 1.1 and the holding element 1.2.

For the dampened mounting or fastening of the cutting blade element 1 on the handle 2, one damping ring element 6, for example a metal or plastic bearing in the form of a ring, is inserted into the hole 1.3 and is inserted together with the cutting blade element 1 into the guide channel 2.5. After full insertion of the holding element 1.2 in the holding space 2.8 or on the end of the guide channel 2.5, the cutting blade element 1 is flexibly connected with the handle 2, namely through a rigid fixing of the lever end in the guide channel 2.5 and a flexible mounting in the area of the rotational axis or of the fastening element 3.

In this position the holes 2.6, 2.7 of the first and second handle shell elements 2.1, 2.2 overlap with the holes 1.3, 1.5 of the cutting blade element 1, so that one fastening element 3.4, preferably a screw connecting element, can be guided through the holes 2.1, 2.2, 2.6, 2.7, 1.3, 1.5, so that the cutting blade element 1 is mounted at least partially moveably and flexibly in the handle 2. In a preferred embodiment the fastening element 3 is designed as a screw connecting element, comprising a screw element 3.1 and a nut element 3.2 that works together with the screw element, wherein the nut element features a bolt-shaped section 3.3. The cutting blade element 1 is therefore moveable relative to the handle element 2, namely to the extent allowed by the flexible mounting.

In a preferred embodiment the cutting blade element 1 or the holding element 1.2 is held by positive locking in the slot-shaped recess 7.1 of the spacer element 7. Alternatively, an additional hole 1.5 can be provided in the holding element 1.2 for holding a second additional fastening element 4, which is provided on the section of the holding element 1.2 facing away from the cutting element 1.1. In the above alternative fastening of the cutting blade element on the handle 2, widened area 7.3 is eliminated, so that the slot 7.1 of the spacer element 7 is connected in its bottom area directly with the holding element 1.2 to produce a positive locking.

The invention was described above based on several exemplary embodiments. It goes without saying that numerous modifications and variations are possible without abandoning the underlying inventive idea upon which the invention is based.

REFERENCE LIST 1 blade or cutting blade element
1.1 cutting element
1.2 holding element
1.3 first hole
1.4 knife edge
1.5 second hole
2 handle or handle element
2.1 first handle shell element
2.2 second handle shell element
2.3 first section of handle element
2.4 second section of handle element
2.5 guide channel
2.51 first section of guide channel
2.52 second section of guide channel 2.6 hole
2.7 additional hole
2.8 holding space
3 fastening element
3.1 screw element
3.2 nut element
3.3 bolt-like section
4 additional fastening element
5 U-shaped sleeve or shell element
6 damping ring element
7 spacer element
7.1 slot-shaped recess
7.2 hole
7.3 widened area
8 fastening element
d distance

What is claimed is:

1. A hoof knife comprising a cutting blade element moveably mounted in a handle element, wherein the cutting blade element is inserted at least partially into a guide channel of said handle element and fixed in said handle element, wherein said cutting blade element being flexibly mounted in a first section of the handle element holding an end of said cutting blade element and wherein at least one damping element for flexible mounting of said cutting blade element is provided in a second section of said handle element and on an end of said guide channel and wherein said at least one damping element comprises a U-shaped sleeve or case element made of flexible material, and wherein said cutting blade element terminates at a hook end forming a knife edge.

2. The knife according to claim 1, wherein said cutting blade element being fixed by means of at least one fastening element in the second section of the handle element.

3. The knife according to claim 2, wherein said cutting blade element being connected by means of at least one additional fastening element with the handle element.

4. The knife according to claim 2, wherein the at least one fastening elements is a screw or rivet for fixing the cutting blade element on the handle element.

5. The knife according to claim 1, wherein said at least one damping element comprises a damping ring element.

6. The knife according to claim 1, wherein the cutting blade element being releasably or permanently connected with the handle element.

7. The knife according to claim 1, wherein said cutting blade element comprises at least one cutting element and one holding element adjoining said cutting element.

8. The knife according to claim 7, wherein said cutting element comprises at least one hole before or within the transition section to the holding element, through which a fastening element can be guided.

9. The knife according to claim 1, wherein said handle element features a first handle shell element and a second handle shell element and one spacer element provided between the first and second handle shell elements.

10. The knife according to claim 9, wherein at least one of the handle shell elements is exchangeable.

11. The knife according to claim 9, wherein the spacer element comprises at least one slot-shaped recess.

12. The knife according to claim 11, wherein the slot-shaped recess comprises a widened area on the end thereof facing away from a fastening element for holding the U-shaped sleeve or case element in the widened area.

13. The knife according to claim 12, wherein the widened area of the slot-shaped recess in the spacer element forms a holding space.

14. The knife according to claim 12, wherein the at least one damping element further comprises a damping ring element surrounding a fastening element.

15. The knife according to claim 14, wherein the damping ring element is inserted into a hole of the cutting blade element.

16. The knife according to claim 1, wherein the guide channel of the handle element comprises first and second sections, wherein the first section is provided for holding a holding element of the cutting blade element and the second section is provided for at least partially holding the cutting blade element in the area of a hole in the cutting blade element.

17. The knife according to claim 16, wherein the first section of the guide channel is formed by a slot-shaped recess and handle shell elements of said handle element surrounding the slot-shaped recess.

18. A hoof knife comprising a cutting blade element moveably mounted in a handle element, wherein the cutting blade element is inserted at least partially into a guide channel of said handle element and fixed in said handle element, wherein said cutting blade element being flexibly mounted in a first section of the handle element holding an end of said cutting blade element and wherein at least one damping element for flexible mounting of said cutting blade element is provided in a second section on an end of said guide channel and wherein said at least one damping element comprises a U-shaped sleeve or case element made of flexible material wherein said handle element features a first handle shell element and a second handle shell element and one spacer element provided between the first and second handle shell elements said spacer element comprises at least one slot-shaped recess wherein the slot-shaped recess comprises a widened area on the end thereof facing away from a fastening element for holding a the U-shaped sleeve or case element in the widened area and wherein the at least one damping element further comprises a damping ring element surrounding a fastening element and wherein the damping ring element is inserted into a hole of the cutting blade element.

* * * * *